(12) United States Patent
Lv

(10) Patent No.: US 12,743,308 B2
(45) Date of Patent: Sep. 22, 2026

(54) COMPUTING POWER REQUEST METHOD, COMPUTING POWER ALLOCATION METHOD, AND COMPUTING POWER EXECUTION METHOD, TERMINAL, AND NETWORK SIDE DEVICE

(71) Applicant: VIVO MOBILE COMMUNICATION CO., LTD., Dongguan (CN)

(72) Inventor: Huazhang Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 56 days.

(21) Appl. No.: 18/442,187

(22) Filed: Feb. 15, 2024

(65) Prior Publication Data

US 2024/0184628 A1 Jun. 6, 2024

Related U.S. Application Data

(63) Continuation of application No. PCT/CN2022/112497, filed on Aug. 15, 2022.

(30) Foreign Application Priority Data

Aug. 18, 2021 (CN) ......................... 202110950241.2

(51) Int. Cl.
*G06F 1/28* (2006.01)
*G06F 9/48* (2006.01)

(52) U.S. Cl.
CPC .............. *G06F 9/4893* (2013.01); *G06F 1/28* (2013.01)

(58) Field of Classification Search
None
See application file for complete search history.

(56) References Cited

U.S. PATENT DOCUMENTS

| | | | | |
|---|---|---|---|---|
| 11,265,369 | B2 * | 3/2022 | Campbell | G06F 9/5072 |
| 2015/0301814 | A1 | 10/2015 | Chen et al. | |
| 2016/0162004 | A1 * | 6/2016 | Ljubuncic | G06F 9/5083 713/320 |
| 2020/0133531 | A1 * | 4/2020 | Subramaniam | G06F 9/5027 |
| 2020/0195524 | A1 | 6/2020 | Clow et al. | |
| 2021/0182118 | A1 | 6/2021 | Sahin | |

FOREIGN PATENT DOCUMENTS

| | | | |
|---|---|---|---|
| CN | 110532092 | A | 12/2019 |
| CN | 110851529 | A | 2/2020 |
| CN | 111866162 | A | 10/2020 |
| CN | 112799789 | A | 5/2021 |
| WO | 2021046674 | A1 | 3/2021 |

OTHER PUBLICATIONS

English Translation of CN110851529 (Year: 2020).*

* cited by examiner

*Primary Examiner* — Fahmida Rahman
(74) *Attorney, Agent, or Firm* — The Webb Law Firm

(57) ABSTRACT

A computing power request method includes sending a computing power request to a network side device, where the computing power request is used to request computing power for a computing power task in the terminal; receiving device information of a target computing power device responded by the network side device, where the target computing power device includes a device or device cluster with a computing power capability; and sending the computing power task to the target computing power device based on the device information, so that the target computing power device executes the computing power task.

15 Claims, 5 Drawing Sheets

800
Communication device
801
Processor
Memory
802

1000
101
Network side device
104
Processor
Radio frequency apparatus
102
Bus interface
103
Baseband apparatus
105
Memory
Network interface
106

COMPUTING POWER REQUEST METHOD, COMPUTING POWER ALLOCATION METHOD, AND COMPUTING POWER EXECUTION METHOD, TERMINAL, AND NETWORK SIDE DEVICE

CROSS-REFERENCE TO RELATED APPLICATIONS

This application is a Bypass Continuation Application of International Patent Application No. PCT/CN2022/112497, filed Aug. 15, 2022, and claims priority to Chinese Patent Application No. 202110950241.2, filed Aug. 18, 2021, the disclosures of which are hereby incorporated by reference in their entireties.

BACKGROUND OF THE INVENTION

Field of the Invention

This application belongs to the field of terminal communication technologies, and particularly, to a computing power request method, a computing power allocation method, and a computing power execution method, a terminal, and a network side device.

Description of Related Art

Computing power may be understood as a computing speed or a computing capability of a specific device, such as a computing speed or a computing capability of a server, a central processing unit (CPU), a graphics processing unit (GPU), a terminal, and the like. The foregoing devices each include a computing unit or a computing capability. Generally, the computing power may be represented by how many calculations are completed per second, such as a quantity of floating-point operations per second (FLOPS), which is generally used to measure parallel computing capabilities of the GPU. For another example, a hash rate is a measurement unit of a processing capability of a Bitcoin network. In other words, the hash rate is a speed at which a computer (CPU) calculates an output of a hash function. The Bitcoin network needs to perform intensive mathematical and cryptography-related operations for a security purpose. For example, when a network reaches a hash rate of 10 Th/s, it means the network may perform 10 trillion calculations per second. A computing power task may be understood as a to-be-completed task that needs to consume a specific amount of computing power. For example, completing a face recognition task for a specific set of photos consumes 10 GPUs of the computing power. A computing power requirement may be understood as computing power resources that need to be consumed to complete the computing power task.

SUMMARY OF THE INVENTION

According to a first aspect, a computing power request method is provided. The method includes:

- sending, by a terminal, a computing power request to a network side device, where the computing power request is used to request computing power for a computing power task in the terminal;
- receiving device information of a target computing power device responded by the network side device, where the target computing power device includes a device or device cluster with a computing power capability; and

- sending the computing power task to the target computing power device based on the device information, so that the target computing power device executes the computing power task.

According to a second aspect, a computing power request apparatus is provided, including:

- a first sending module, configured to send a computing power request to a network side device, where the computing power request is used to request computing power for a computing power task in a terminal;
- a receiving module, configured to receive device information of a target computing power device responded by the network side device, where the target computing power device includes a device or device cluster with a computing power capability; and
- a second sending module, configured to send the computing power task to the target computing power device based on the device information, so that the target computing power device executes the computing power task.

According to a third aspect, a computing power allocation method is provided, including:

- receiving, by a network side device, a computing power request from a terminal, where the computing power request is used to request computing power for a computing power task in the terminal;
- determining a target computing power device based on the computing power request, where the target computing power device includes a device or device cluster with a computing power capability; and
- sending device information of the target computing power device to the terminal, so that the terminal sends the computing power task to the target computing power device based on the device information, and the target computing power device executes the computing power task.

According to a fourth aspect, a computing power allocation apparatus is provided, including:

- a receiving module, configured to receive a computing power request from a terminal, where the computing power request is used to request computing power for a computing power task in the terminal;
- a determining module, configured to determine a target computing power device based on the computing power request, where the target computing power device includes a device or device cluster with a computing power capability; and
- a sending module, configured to send device information of the target computing power device to the terminal, so that the terminal sends the computing power task to the target computing power device based on the device information, and the target computing power device executes the computing power task.

According to a fifth aspect, a computing power execution method is provided, including:

- receiving, by a target computing power device, a computing power task from a terminal, where the computing power task is sent by the terminal based on device information of the target computing power device, the device information is responded to the terminal by a network side device after receiving a computing power request from the terminal and determining the target computing power device, the computing power request is used to request computing power for the computing power task in the terminal, and the target computing power device includes a device or device cluster with a computing power capability; and executing the computing power task.

According to a sixth aspect, a computing power execution apparatus is provided, including:

a receiving module, configured to receive a computing power task from a terminal, where the computing power task is sent by the terminal based on device information of a target computing power device, the device information is responded to the terminal by a network side device after receiving a computing power request from the terminal and determining the target computing power device, the computing power request is used to request computing power for the computing power task in the terminal, and the target computing power device includes a device or device cluster with a computing power capability; and a task execution module, configured to execute the computing power task.

According to a seventh aspect, a terminal is provided, including a processor, a memory, and a program or an instruction stored in the memory and executable on the processor, where when the program or instruction is executed by the processor, the steps of the method according to the first aspect are implemented.

According to an eighth aspect, a terminal is provided, including a processor and a communication interface. The communication interface is configured to send a computing power request to a network side device, where the computing power request is used to request computing power for a computing power task in the terminal; receive device information of a target computing power device responded by the network side device, where the target computing power device includes a device or device cluster with a computing power capability; and send the computing power task to the target computing power device based on the device information, so that the target computing power device executes the computing power task.

According to a ninth aspect, a network side device is provided, where the network side device includes a processor, a memory, and a program or an instruction stored in the memory and executable on the processor, where when the program or instruction is executed by the processor, the steps of the method according to the third aspect are implemented.

According to a tenth aspect, a network side device is provided, including a processor and a communication interface. The communication interface is configured to receive a computing power request from a terminal, where the computing power request is used to request computing power for a computing power task in the terminal. The processor is configured to determine a target computing power device based on the computing power request, where the target computing power device includes a device or device cluster with a computing power capability. The communication interface is configured to send device information of the target computing power device to the terminal, so that the terminal sends the computing power task to the target computing power device based on the device information, and the target computing power device executes the computing power task.

According to an eleventh aspect, a target computing power device is provided, including a processor, a memory, and a program or an instruction stored in the memory and executable on the processor, where when the program or instruction is executed by the processor, the steps of the method according to the fifth aspect are implemented.

According to a twelfth aspect, a target computing power device is provided, including a processor and a communication interface. The communication interface is configured to receive a computing power task from a terminal, where the computing power task is sent by the terminal based on device information of the target computing power device, the device information is responded to the terminal by a network side device after receiving a computing power request from the terminal and determining the target computing power device, the computing power request is used to request computing power for the computing power task in the terminal, and the target computing power device includes a device or device cluster with a computing power capability; and the processor is configured to execute the computing power task.

According to a thirteenth aspect, a non-transitory readable storage medium is provided, storing a program or an instruction, where when the program or instruction is executed by a processor, the steps of the method according to the first aspect are implemented, or the steps of the method according to the third aspect are implemented, or the steps of the method according to the fifth aspect are implemented.

According to a fourteenth aspect, a chip is provided, including a processor and a communication interface, where the communication interface is coupled to the processor, and the processor is configured to run a program or an instruction, to implement the method according to the first aspect, or implement the method according to the third aspect, or implement the steps of the method according to the fifth aspect.

According to a fifteenth aspect, a computer program/program product is provided, being stored in a non-volatile storage medium, where the program/program product, when executed by at least one processor, implements the steps of the method according to the first aspect, or implements the method according to the third aspect, or implements the steps of the method according to the fifth aspect.

DESCRIPTION OF THE INVENTION

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, terms “first” and “second” are used to distinguish similar objects, but are not used to describe a specific sequence or order. It may be understood that the terms used in such a way is interchangeable in proper circumstances, so that embodiments of this application can be implemented in other sequences than the sequence illustrated or described herein. In addition, objects distinguished by “first” and “second” are usually of Type, and the number of objects is not limited. For example, a first object may be one or more than one. In addition, in the specification and claims, “and/or” means at least one of the connected objects, and the character “/” generally indicates an “or” relation between associated objects.

It should be noted that, the technology described in embodiments of this application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms “system” and “network” in embodiments of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a 6-th generation (6G) communication system.

Figure 1:
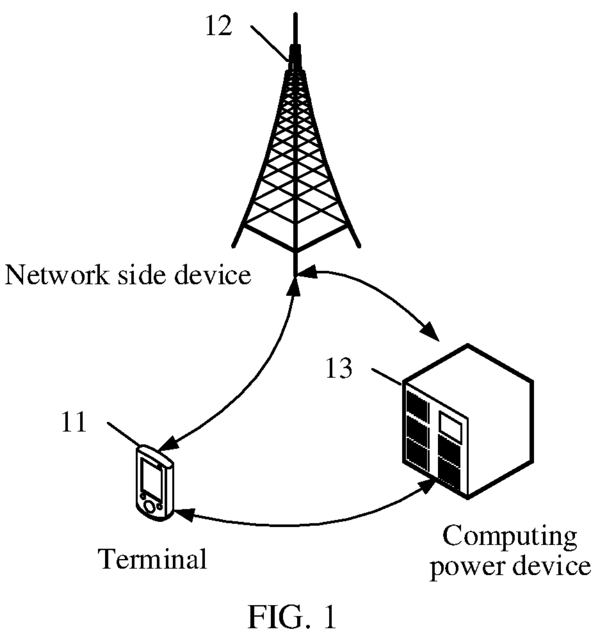
FIG. 1 is a schematic diagram of a wireless communication system according to an embodiment of this application.

FIG. 1 is a block diagram of a wireless communication system to which an embodiment of this application may be applied. The wireless communication system includes a terminal 11, a network side device 12, and a computing power device 13. The terminal 11 may also be referred to as a terminal device or user equipment (UE). The terminal 11 may be a terminal side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment, (PUE). The wearable device includes: a smart watch, a bracelet, headphones, glasses, or the like. It is to be noted that in embodiments of this application, a type of the terminal 11 is not limited. The network side device 12 may be understood as a management platform for computing resources or a computing power management network element, may be a 5G core network element, such as a session management function (SMF), an access management function (AMF), a network data analytics function (NWDAF), a computing resource control function, (CSCF), and the like, and may be a base station or a core network. The base station may be referred to as an access point, a base transceiver station (BTS), a radio base station, a radio transceiver, a basic service set (BSS), an extended service set (ESS), a NodeB, an evolution NodeB (eNB), a household NodeB, a household evolution NodeB, a WLAN access point, a WiFi node, a transmission and reception point (TRP), or some other proper terms in the field. Provided that the same technical effect is achieved, the base station is not limited to a specific technical vocabulary. It should be noted that in embodiments of this application, only a base station in the NR system is used as an example, but a type of the base station is not limited. The computing power device 13 may be a device or device cluster with a computing power capability, and may be a terminal, a network element of a core network, a server, an edge cloud, a central cloud, or the like.

The computing power request method, the computing power allocation method, the terminal, and the network side device provided in embodiments of this application are described in detail below by using some embodiments and application scenarios with reference to the accompanying drawings.

Usually, when a terminal has a computing power task, for example, there is a computing power task inside the terminal, or a computing power task in an application in the terminal is to be executed, the terminal may execute the computing power task locally by using computing power resources of the terminal. However, in actual application, when the terminal executes the computing power task locally, there may be a problem of insufficient computing power. In other words, a computing power requirement of the computing power task of the terminal or the computing power task of the application is greater than a computing power capability of the terminal, thus affecting execution efficiency of the computing power task, and even causing execution of the computing power task to fail.

Figure 2:
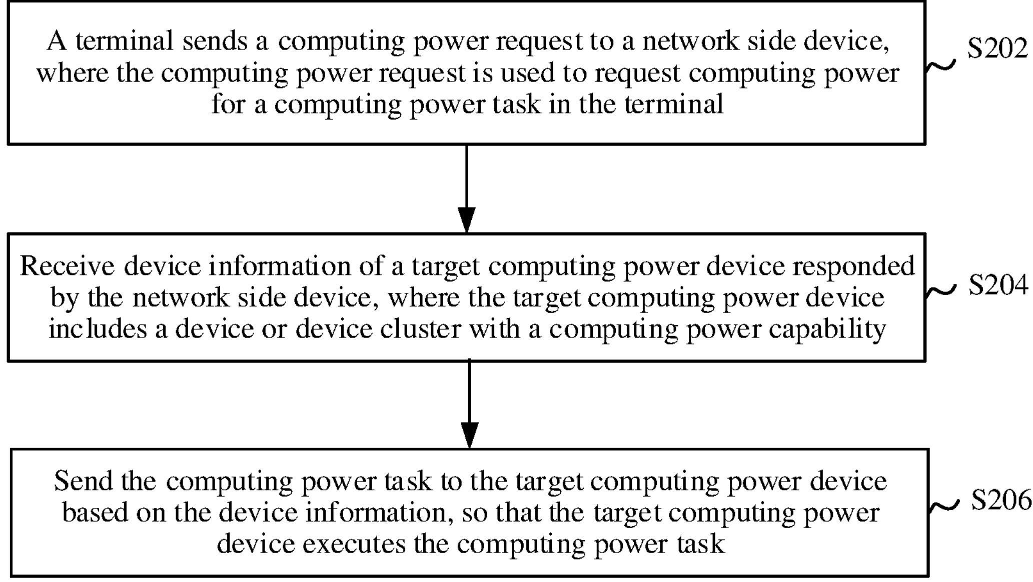
FIG. 2 is a schematic flowchart of a computing power request method according to an embodiment of this application.

As shown in FIG. 2, embodiments of this application provide a computing power request method 200. The method may be performed by a terminal. In other words, the method may be performed by software or hardware installed in the terminal, and the method includes the following steps.

S202: A terminal sends a computing power request to a network side device, where the computing power request is used to request computing power for a computing power task in the terminal.

When there is the computing power task in the terminal, the terminal may send the computing power request to the network side device, to request the computing power for the computing power task in the terminal. For example, when the terminal needs to perform face recognition on 1 million pictures, the terminal may send a computing power request to the network side device. The “performing face recognition on 1 million pictures” is the computing power task in the terminal.

Optionally, when the terminal sends the computing power request to the network side device, the method may be implemented by at least one of the following manners.

First manner: The terminal sends computing power requirement information of the computing power task to the network side device.

In other words, when sending the computing power request, the terminal may send the computing power requirement information. The computing power requirement information is used for determining, by the network side device, a target computing power device that matches a computing power requirement, and the computing power requirement information may include at least one of the following: a total amount of computing power required for the computing power task, a type of computing power required for the computing power task, an expected completing time period of the computing power task, or algorithm model information required for the computing power task. The total amount of computing power required for the computing power task may be a total quantity of CPUs, GPUs, or servers required for the computing power task, and the like. The type of computing power required for the computing power task may be what kind of computing power is required for the computing power task, such as a CPU, a GPU, an FPGA, or a server, and the like. The expected completing time period of the computing power task may be a time period in which the computing power task is expected to be completed, for example, may be 1 hour, 2 hours, and the like. The algorithm model information required by the computing power task may be information about a model required by the computing power task, for example, may be a name of the algorithm model, detailed parameters required by the algorithm model, and the like.

Second manner: The terminal sends computing power task description information to the network side device, and the computing power task description information is used for determining the computing power requirement information.

In other words, when sending the computing power request, the terminal may send the computing power task description information instead of sending a specific computing power requirement. The computing power task description information may be used by the network side device to perform parsing to obtain the computing power requirement information. The computing power task description information may include at least one of the following: a type of the computing power task, a type of an algorithm model required for the computing power task, a task volume description of the computing power task, an expected completing time range of the computing power task, or an expected completing success rate of the computing power task. The type of the computing power task may include at least one of the following: an artificial intelligence (AI) service, a data processing type service, an image processing type, or an audio processing type service. The type of the algorithm model may be a category of the algorithm model required to execute the computing power task. Each type of algorithm model may include a plurality of algorithm models. The network side device may determine which algorithm model is required for the computing power task based on the type of the algorithm model, and then determine the corresponding algorithm model information. The task volume description of the computing power task may be a detailed description of the computing power task volume. The expected completing time range of the computing power task may be a time range in which the computing power task is expected to be completed, for example, may be 1 to 2 hours, 2 to 3 hours, and the like. The network side device may determine the expected completing time period of the computing power task based on the expected completing time range of the computing power task. An expected completing success rate of the computing power task may be an expected success rate of execution of the computing power task after execution of the computing power task is completed. For example, when performing face recognition on 1 million pictures, an expected recognition success rate is above 99%.

For example, the computing power task description information may be: The terminal needs a CPU, needs to use an AI model for face recognition, and needs to perform face recognition on 1 million pictures. The CPU is the type of the computing power task, the AI model for face recognition is the algorithm model required for the computing power task, and performing face recognition on 1 million pictures is the task description of the computing power task.

In this embodiment, the computing power task in the terminal may be a computing power task of a target application installed in the terminal, or may be a computing power task (namely, a computing power task of a non-target application) of the terminal. The computing power task of the target application may be, for example, a computing power task of performing processing on several videos by the target application for video processing.

In a case that the computing power task in the terminal is the computing power task of the target application, before the terminal sends the computing power request to the network side device, the target application in the terminal may send the computing power request to the terminal. In other words, in a case that the target application in the terminal has a computing power requirement, the target application may send a computing power request to the terminal, and then the terminal sends the computing power request to the network side device. The terminal may refer to a terminal operating system (OS).

Optionally, when sending the computing power request to the terminal, the target application may also be implemented in either of the foregoing two manners. In other words, the target application may send at least one of the computing power requirement information or the computing power task description information to the terminal. If the target application sends the computing power task description information to the terminal, then when sending a computing power request to the network side device, the terminal may directly send the computing power task description information to the network side device, or may first parse the computing power task description information, to obtain the computing power requirement information, and then send the computing power requirement information to the network side device.

Generally, that the terminal sends the computing power request to the network side device may include at least one of the following four cases:

- first case: There is a computing power task of the terminal in the terminal, and the terminal sends computing power requirement information of the computing power task to the network side device;
- second case: There is a computing power task of the terminal in the terminal, and the terminal sends the computing power task description information to the network side device;
- third case: There is a computing power task in the target application in the terminal, the target application sends the computing power requirement information of the computing power task to the terminal, and the terminal sends the computing power requirement information to the network side device; or
- fourth case: There is a computing power task in the target application in the terminal, and the target application sends the computing power task description information to the terminal. The terminal sends the computing power task description information to the network side device, or the terminal determines the computing power requirement information based on the computing power task description information, and sends the computing power requirement information to the network side device.

For the network side device, the network side device may receive at least one of the computing power requirement information or the computing power task description information from the terminal.

S204: Receive device information of a target computing power device responded by the network side device, where the target computing power device includes a device or device cluster with a computing power capability.

After receiving the computing power request from the terminal, the network side device may determine the target computing power device from a plurality of computing power devices based on the computing power request. In other words, based on the computing power request, the network side device finds the target computing power device that may match the computing power requirement, and then sends device information of the target computing power device to the terminal. A plurality of computing power devices and the target computing power device are devices or device clusters with computing power capabilities, and the target computing power device may be configured to execute the computing power task of the terminal. For an implementation for the network side device to determine the target computing power device, refer to the embodiment of the computing power allocation method shown in FIG. 3. This is not repeated herein.

S206: Send the computing power task to the target computing power device based on the device information, so that the target computing power device executes the computing power task.

After receiving the device information of the target computing power device sent by the network side device, the terminal may locate the target computing power device based on the device information, and send the computing power task to the target computing power device, so that the target computing power device executes the computing power task.

The device information of the target computing power device may include at least one of the following: device address information or a device identifier. The device address information may be an internet protocol (IP) address, a uniform resource locator (URL) address, a fully qualified domain name (FQDN), and the like. The device identifier may be a device identifier (ID) of the target computing power device, and the like. When sending the computing power task to the target computing power device, first, the terminal may establish a connection with the target computing power device based on at least one of the device address information or the device identifier, such as an IP connection, and the like. In a case that the connection is successfully established, the terminal may send the computing power task to the target computing power device. When sending the computing power task, the terminal may send computing power data, an algorithm, and the like. For example, if the computing power task is to perform face recognition on 1 million pictures, the terminal may send 1 million pictures (computing power data) and the corresponding face recognition algorithm to the target computing power device.

In this embodiment, a quantity of target computing power devices may be one or more than one. In a case that the quantity of target computing power devices is one, the target computing power device may independently execute the computing power task of the terminal, or the target computing power device may jointly execute the computing power task with another computing power device. In other words, in a case that the quantity of target computing power devices is one, the terminal may send the computing power task to the target computing power device. After receiving the computing power task, the target computing power device may independently execute the computing power task, or may split the computing power task and allocate a split computing power task to another computing power device, to jointly execute the computing power task with the another computing power device. How to split the computing power task may be determined according to an actual requirement. This is not limited herein.

The another computing power device may be determined by the network side device. For an implementation, refer to the embodiment of the computing power allocation method shown in FIG. 3. This is not described in detail herein. After determining the target computing power device and the another computing power device, the network side device may send the device information of the target computing power device to the terminal, and send the device information of the another computing power device to the target computing power device, so that the terminal sends the computing power task to the target computing power device based on the device information of the target computing power device. After receiving the computing power task and splitting the computing power task, the target computing power device may allocate the split computing power task to the another computing power device based on the device information of the another computing power device. The target computing power device may be referred to as a primary device, and the another computing power device may be referred to as a secondary device. The primary device is configured to receive the computing power task of the terminal, split the computing power task and then distribute the split computing power task to the secondary device. The secondary device is configured to participate in execution of the computing power task of the terminal, and only execute the computing power task allocated to the secondary device by the primary device.

In a case that the quantity of target computing power devices is more than one, and when sending the computing power task, the terminal may first split the computing power task into a plurality of computing power subtasks, and then send the plurality of computing power subtasks to the plurality of target computing power devices. Different target computing power devices are configured to execute different computing power subtasks. It should be noted that the plurality of target computing power devices may be understood as a set of the primary device and the secondary device. In other words, when determining the plurality of target computing power devices, in addition to sending the device information of the primary device to the terminal, and sending the device information of the secondary device to the primary device, the network side device may further send the device information of the plurality of target computing power devices to the terminal, so that the terminal may split the computing power task and distribute the split computing power task to the plurality of target computing power devices for execution.

Because when there is a computing power task in the terminal, the terminal may request computing power from the network side device, and the network side device determines the target computing power device with the computing power capability, and allocates the computing power of the target computing power device to the terminal, so that the terminal may execute the computing power task with the help of the computing power of the target computing power device. Therefore, when the computing power of the terminal is insufficient, normal execution of the computing power task may be guaranteed.

Optionally, after sending the computing power task to the target computing power device, the terminal may further receive a computing power task execution result responded by the target computing power device. If the quantity of target computing power devices is one and the target computing power device independently executes the computing power task, the computing power task execution result received by the terminal is an execution result of the computing power task executed by the target computing power device. If the quantity of target computing power devices is one and the target computing power device and the another computing power device jointly execute the computing power task, the computing power task execution result received by the terminal is a joint execution result of the computing power task executed by the target computing power device and the another computing power device. The execution result of the target computing power device may be directly sent to the terminal, and the execution result of the another computing power device may be first sent to the target computing power device, and then sent to the terminal by the target computing power device. If the quantity of target computing power devices is more than one, the computing power task execution result received by the terminal is the execution result of the computing power task executed by the plurality of target computing power devices.

After receiving the computing power task execution result, the terminal may determine whether the computing power task execution result meets a preset condition or determine, based on the computing power task execution result, whether execution of the computing power task succeeds. Meeting the preset condition may mean that the computing power task execution result meets a preset execution effect, for example, accuracy of the execution result is higher than a set threshold, an execution time period of the computing power task meets a requirement, and the like. An execution success of the computing power task may mean that execution of the computing power task succeeds without considering the execution effect. If a determining result is that the computing power task execution result meets the preset condition or it is determined, based on the computing power task execution result, that execution of the computing power task succeeds, the terminal may send notification information to the network side device. The notification information is used for telling the network side device that the execution result of the computing power task is in line with expectations, and to notify the network side device to release the computing power reserved for the computing power task of the terminal, to be specific, release the computing power reserved for the computing power task of the target computing power device, otherwise, the target computing power device may continue to execute the computing power task, until the computing power task execution result meets the preset condition or it is determined, based on the computing power task execution result, that execution of the computing power task succeeds.

Because when the computing power task execution result of the terminal meets the preset condition or execution of the computing power task succeeds, the network side device may release the computing power reserved for the computing power task, on one hand, the computing power of the target computing power device is not occupied for a long time and thus affecting normal use of the target computing power device, and on the other hand, it may facilitate the target computing power device to reserve the computing power for other computing power tasks after releasing the computing power, so that use of the computing power is more flexible.

Figure 3:
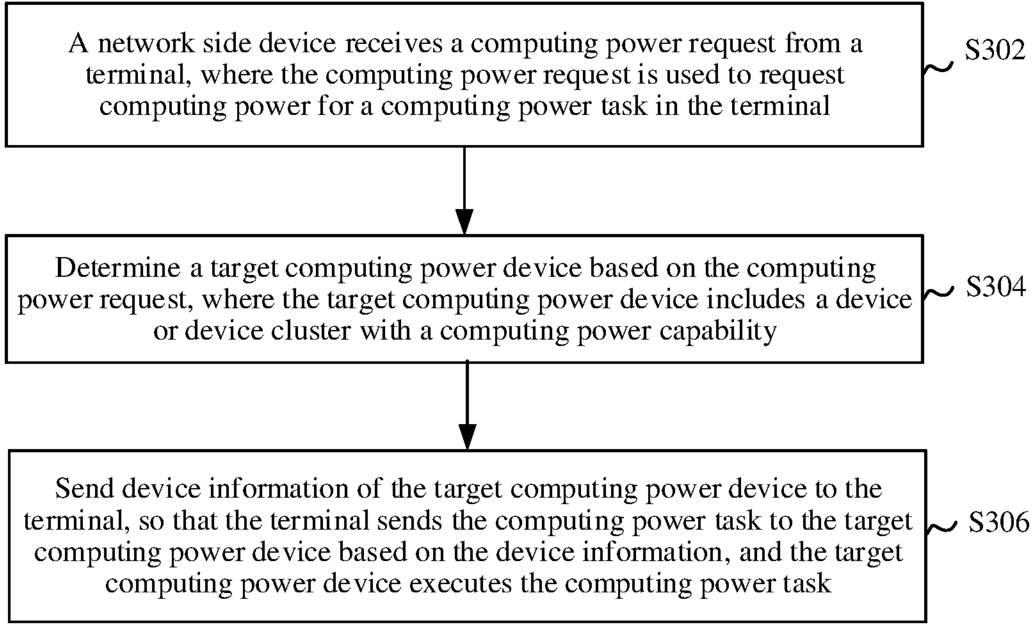
FIG. 3 is a schematic flowchart of a computing power allocation method according to an embodiment of this application.

As shown in FIG. 3, embodiments of this application provide a computing power allocation method 300. The method may be performed by a network side device. In other words, the method may be performed by software or hardware installed in the network side device, and the method includes the following steps.

S302: A network side device receives a computing power request from a terminal, where the computing power request is used to request computing power for a computing power task in the terminal.

When there is the computing power task in the terminal, the terminal may send the computing power request to the network side device, to request the computing power for the computing power task in the terminal. The network side device may receive the computing power request from the terminal. For an implementation for the terminal to send the computing power request, refer to the embodiment of the computing power request method shown in FIG. 2. This is not repeated again.

In this embodiment, that the network side device receives the computing power request from the terminal may include at least one of the following:

- receiving computing power requirement information of the computing power task from the terminal, where the computing power requirement information includes at least one of the following: a total amount of computing power required for the computing power task, a type of computing power required for the computing power task, or an expected completing time period of the computing power task; or
- receiving computing power task description information from the terminal, where the computing power task description information is used for determining the computing power requirement information, and the computing power task description information includes at least one of the following: a type of the computing power task, an algorithm model required for the computing power task, or a task volume description of the computing power task.

In other words, the computing power request received by the network side device may be at least one of the computing power requirement information or the computing power task description information. For a detailed introduction to the computing power requirement information and the computing power task description information, refer to the embodiment shown in FIG. 2. This is not repeated herein.

S304: Determine a target computing power device based on the computing power request, where the target computing power device includes a device or device cluster with a computing power capability.

After receiving the computing power request, the network side device may determine the target computing power device from a plurality of computing power devices based on the computing power request. In other words, based on the computing power request, the network side device may find the target computing power device that may match the computing power requirement, and reserve computing power resources that match the computing power requirement in the target computing power device.

When determining the target computing power device based on the computing power request, the network side device may determine the target computing power device based on the computing power requirement information of the computing power task. If the computing power request received by the network side device includes the computing power requirement information, the target computing power device may be directly determined based on the computing power requirement information of the computing power task. If the computing power request received by the network side device includes computing power task description information, then when determining the target computing power device, the computing power task description information may be first parsed (may be performed by the network side device, or a network element may be analyzed by additional computing power task description information). The parsing process is mainly performed according to the computing power task description information. After analysis and determining, the computing power requirement information corresponding to the computing power task is obtained, and then the target computing power device is determined based on the computing power requirement information.

When the target computing power device is determined based on the computing power requirement information, the following steps may be included:

S3041: Obtain computing power state information of a plurality of computing power devices in advance.

Computing power state information of the computing power devices may include at least one of the following: a total amount of computing power, a usage amount of computing power, a type of computing power, or available computing power. The computing power state information of the plurality of computing power devices may be reported to the network side device by carrying the computing power state information in a registration request before a plurality of computing power devices establish a protocol data unit (PDU) session with the network side device, and when performing registration in the network side device, or the computing power state information may also be reported to the network side device after performing registration in the network side device, and when establishing a PDU session with the network side device, or the computing power state information may also be reported to the network side device in other manners, which are not described one by one by using examples.

After receiving the computing power state information of the plurality of computing power devices, the network side device may store the computing power information. When needing to determine the target computing power device according to the computing power requirement information of the terminal, the network side device may obtain the computing power state information of the plurality of computing power devices obtained in advance.

S3042: Match computing power requirement information with the computing power state information of the plurality of computing power devices, and determine at least one matched candidate computing power device.

In this embodiment, the computing power state information of the plurality of computing power devices may be separately matched with the computing power requirement information of the computing power task. According to a matching result, one or more matched computing power devices may be used as candidate computing power devices. The matching may be at least one of the following: a type of computing power of the computing power device includes a type of computing power required for the computing power task, the available computing power of computing power device is greater than or equal to a total amount of computing power required for the computing power task, task execution efficiency of the computing power device meets or exceeds a requirement of the computing power task, or a distance between the computing power device and the terminal is less than a preset distance (meets a delay requirement). Optionally, the matching may be further matching between other information of the computing power device and the terminal or the computing power task of the terminal, and may be set according to an actual condition. This is not limited herein.

S3043: Determine a target computing power device based on the at least one candidate computing power device.

If a quantity of candidate computing power devices is one, a computing power reservation request may be sent to the candidate computing power device. The computing power reservation request is used to request the candidate computing power device to reserve computing power resources that match the computing power reservation request. After receiving the computing power reservation request, the candidate computing power device may reserve the available computing power or the total amount of computing power that matches the computing power resources in the computing power reservation request. If the reservation succeeds, computing power reservation success information may be responded. If the reservation fails, computing power reservation failure information may be responded or no information may be responded. For the network side device, if the computing power reservation success information responded by the candidate computing power device is received, the candidate computing power device may be determined as the target computing power device, thereby obtaining one target computing power device. If no computing power reservation success information is received from the candidate computing power device or the computing power reservation failure information responded by the candidate computing power device is received, it may be determined that there is no target computing power device. It means that the computing power device fails to reserve computing power, and the device may no longer be used to execute the computing power task. In this embodiment, that the computing power reservation success information is received is used as an example for description.

If a quantity of candidate computing power devices is more than one, one or more candidate computing power devices may be selected from the candidate computing power devices as the target computing power device. An implementation is as follows.

The network side device may send the computing power reservation request to the plurality of candidate computing power devices. For any candidate computing power device, if the computing power reservation success information responded by the candidate computing power device is received, the candidate computing power device may be determined as the target computing power device. If the computing power reservation success information from the candidate computing power device is not received or the computing power reservation failure information responded by the candidate computing power device is received, the candidate computing power device may not be determined as the target computing power device. Therefore, one or more target computing power devices may be determined.

Alternatively, the network side device may also send a computing power reservation request to the at least one candidate computing power device based on a descending order of a priority of the computing power device, and then determine a first candidate computing power device among the at least one candidate computing power device as the target computing power device, where the first candidate computing power device is a computing power device that receives the computing power reservation request and responds the computing power reservation success information. In other words, the network side device may first send the computing power reservation request to a candidate computing power device with a highest priority. If the computing power reservation success information responded by the candidate computing power device is received, the candidate computing power device may be determined as the target computing power device. If the computing power reservation success information of the candidate computing power device is not received or the computing power reservation failure information responded by the candidate computing power device is received, the computing power reservation information may be sent to a candidate computing power device with a second priority. The cycle continues until the computing power reservation success information of one of the candidate computing power devices is received, and the candidate computing power device is determined as the target computing power device. Optionally, after determining one target computing power device, the computing power reservation information may no longer be sent to another candidate computing power device. In this way, one target computing power device may be determined, or the computing power reservation information may continue to be sent to the another candidate computing power device, so that a plurality of target computing power devices may be determined.

The priority of the computing power device is determined based on at least one of the following: the total amount of computing power of the computing power device, a matching degree between the total amount of computing power and the computing power task, or a routing distance between the computing power device and the terminal. The greater the total amount of computing power of the computing power device, the higher the priority of the computing power device, and the higher the degree of matching between the total amount of computing power and the computing power task. The higher the priority of the computing power device, the closer the routing distance between the computing power device and the terminal (that is, the smaller the delay), the higher the priority of the computing power device. The matching degree between the total amount of computing power and the computing power task may represent an execution effect (such as a completion time period of the computing power task, accuracy of the execution result, and the like) of the computing power task, a matching degree of the computing power type, and the like.

S306: Send device information of the target computing power device to the terminal, so that the terminal sends the computing power task to the target computing power device based on the device information, and the target computing power device executes the computing power task.

After determining the target computing power device, the network side device may send the device information of the target computing power device to the terminal. The device information of the target computing power device may be reported to the network side device when the target computing power device reports the computing power state information to the network side device. The device information of the target computing power device may include at least one of the following: device address information or a device identifier.

Optionally, when sending the device information of the target computing power device, and in a case that the quantity of target computing power devices is one, the network side device may directly send the device information of the target computing power device to the terminal. In a case that the quantity of target computing power devices is more than one, the network side device may send the device information of the target computing power device in the following two manners.

First manner: Send the device information of the plurality of target computing power devices to the terminal.

In the first manner, after receiving the device information of the plurality of target computing power devices, the terminal may split the computing power task into a plurality of computing power subtasks. Based on the device information of the plurality of target computing power devices, the terminal separately sends the plurality of computing power subtasks to the plurality of target computing power devices, and different target computing power devices execute different computing power subtasks. The manner relies on a fact that the terminal may split the computing power task into computing power subtasks, and then separately send the computing power subtasks to different target computing power devices.

A second manner: Determine the primary device and the secondary device among the plurality of target computing power devices, send the device information of the primary device to the terminal, and send the device information of the secondary device to the primary device.

The primary device may be one of the plurality of target computing power devices, and the secondary device may be another target computing power device other than the primary device among the plurality of target computing power devices. The primary device is configured to receive the computing power task of the terminal and split the computing power task, and then allocate the split computing power task to the secondary device, to jointly execute the computing power task with the secondary device. The secondary device is configured to participate in the execution of the computing power task, and only executes the part of the computing power task allocated to the secondary device by the primary device. The network side device may determine which computing power device among the plurality of target computing power devices is the primary device according to the actual condition, and the remaining computing power devices are the secondary devices. After determining the primary device and the secondary device, the device information of the primary device may be sent to the terminal, and the device information of the secondary device may be sent to the primary device, so that the terminal may send the computing power task to the primary device based on the device information of the primary device. After receiving the computing power task, the primary device splits the computing power task, and allocates the split computing power task to the secondary device based on the device information of the secondary device, to jointly execute the computing power task.

In this embodiment, after the network side device sends the device information of the target computing power device to the terminal, the terminal may send the computing power task to the target computing power device based on the received device information, so that the computing power device executes the computing power task. For an implementation, refer to the embodiment of the computing power request method shown in FIG. 2. This is not repeated herein.

Because when there is a computing power task in the terminal, the terminal may request computing power from the network side device, and the network side device determines the target computing power device with the computing power capability, and allocates the computing power of the target computing power device to the terminal, so that the terminal may execute the computing power task with the help of the computing power of the target computing power device. Therefore, when the computing power of the terminal is insufficient, normal execution of the computing power task may be guaranteed.

Optionally, after sending the device information of the target computing power device to the terminal, the network side device may further release the computing power reserved by the target computing power device for the computing power task of the terminal when receiving the notification information sent by the terminal. An implementation is as follows.

After the terminal sends the computing power task to the target computing power device, the target computing power device executes the computing power task, and sends the computing power task execution result to the terminal. The terminal may determine whether the computing power task execution result meets a preset condition or determine, based on the computing power task execution result, whether execution of the computing power task succeeds. If the computing power task execution result meets the preset condition or it is determined that execution of the computing power task succeeds based on the computing power task execution result, the terminal sends notification information to the network side device. After receiving the notification information, the network side device may trigger release of resources of the target computing power device that executes the computing power task for the terminal, and send a computing power release request to the target computing power device. After receiving the computing power release request, the target computing power device may release the computing power reserved for the computing power task of the terminal.

Because when the computing power task execution result of the terminal meets the preset condition or execution of the computing power task succeeds, the network side device may release the computing power reserved by the target computing power device for the computing power task, on one hand, the computing power of the target computing power device is not occupied for a long time and thus affecting normal use of the target computing power device, and on the other hand, it may facilitate the target computing power device to reserve computing power for other computing power tasks after releasing the computing power, making use of the computing power more flexible.

Figure 4:
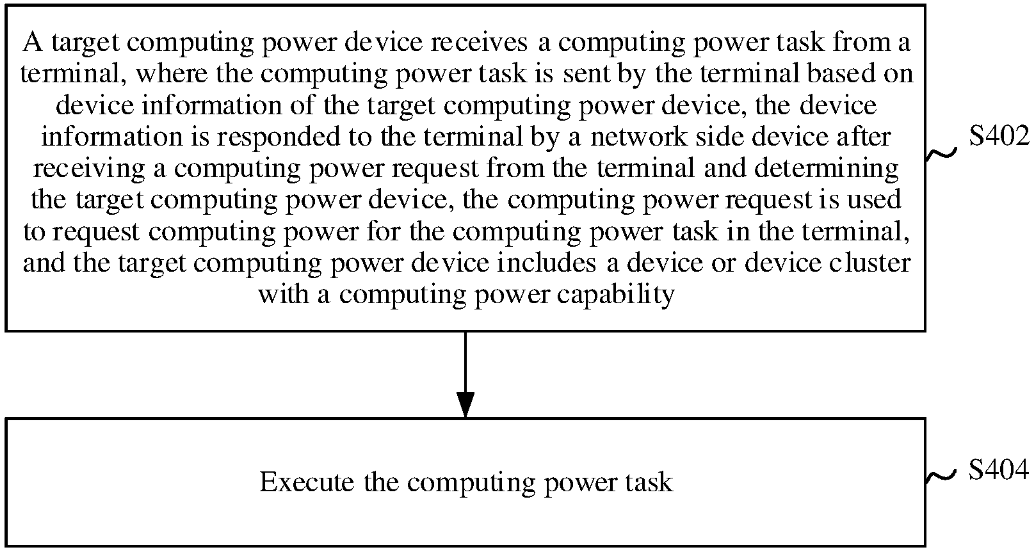
FIG. 4 is a schematic flowchart of a computing power execution method according to an embodiment of this application.

As shown in FIG. 4, embodiments of this application provide a computing power execution method 400. The method may be performed by a target computing power device. In other words, the method may be performed by software or hardware installed in the target computing power device, and the method includes the following steps.

S402: A target computing power device receives a computing power task from a terminal, where the computing power task is sent by the terminal based on device information of the target computing power device, the device information is responded to the terminal by a network side device after receiving a computing power request from the terminal and determining the target computing power device, the computing power request is used to request computing power for the computing power task in the terminal, and the target computing power device includes a device or device cluster with a computing power capability.

When there is the computing power task in the terminal, the terminal may send the computing power request to the network side device, to request the computing power for the computing power task in the terminal. After receiving the computing power request, the network side device may determine the target computing power device based on the computing power request, and send the device information of the target computing power device to the terminal. After receiving the device information, the terminal may send the computing power task to the target computing power device based on the device information. The target computing power device may receive the computing power task from the terminal. For an implementation for the terminal to send a computing power request to the network side device and send the computing power task to the target computing power device, refer to an implementation of the corresponding steps in the embodiment shown in FIG. 2. For an implementation for the network side device to determine the target computing power device, refer to an implementation of the corresponding steps in the embodiment shown in FIG. 3. This is not repeated herein.

It should be noted that a quantity of target computing power devices determined by the network side device may be one or more than one. In a case that the quantity of target computing power devices is one, an execution entity of the method shown in FIG. 4 is one target computing power device. In a case that the quantity of target computing power devices is more than one, if the network side device sends the device information of the plurality of target computing power devices to the terminal, an execution entity of the method shown in FIG. 4 is one of the target computing power devices. If the network side device only sends the device information of one (namely, the primary device) of the target computing power devices to the terminal, the execution entity of the method shown in FIG. 4 is the primary device.

S404: Execute the computing power task.

After receiving the computing power task, the target computing power device may execute the computing power task.

Optionally, if the quantity of target computing power devices determined by the network side device is one, when executing the computing power task, the target computing power device may independently execute the computing power task. If the quantity of target computing power devices determined by the network side device is more than one, and the device information of the plurality of target computing power devices is sent to the terminal, when executing the computing power task, for each target computing power device, the computing power subtask allocated to the target computing power device by the terminal may be executed. If the quantity of target computing power devices determined by the network side device is more than one, and only the device information of one (namely, the primary device) of the plurality of target computing power devices is sent to the terminal, then when executing the computing power task, the computing power task may be split and allocated to the another computing power device (namely, the secondary device), to jointly execute the computing power task.

Because when there is a computing power task in the terminal, the terminal may request computing power from the network side device, and the network side device determines the target computing power device with the computing power capability, and allocates the computing power of the target computing power device to the terminal, so that the terminal may execute the computing power task with the help of the computing power of the target computing power device. Therefore, when the computing power of the terminal is insufficient, normal execution of the computing power task may be guaranteed.

Optionally, after completing execution of the computing power task, the target computing power device may respond the computing power task execution result to the terminal. If the computing power task is jointly executed by the primary device and the secondary device, the secondary device may first send the computing power task execution result to the primary device, and then the primary device sends the computing power task execution result to the terminal.

After receiving the computing power task execution result, the terminal may send notification information to the network side device in a case of determining that the computing power task execution result meets the preset condition or determining, based on the computing power task execution result, that execution of the computing power task succeeds. After receiving the notification information, the network side device may send a computing power release request to the target computing power device, to request release of the computing power reserved for the computing power task. After receiving the computing power release request, the target computing power device may release the computing power reserved for the computing power task.

Because when the computing power task execution result of the terminal meets the preset condition or execution of the computing power task succeeds, the network side device may release the computing power reserved for the computing power task, on one hand, the computing power of the target computing power device is not occupied for a long time and thus affecting normal use of the target computing power device, and on the other hand, it may facilitate the target computing power device to reserve the computing power for other computing power tasks after releasing the computing power, so that use of the computing power is more flexible.

It should be noted that in the computing power request method provided in embodiments of this application, an execution entity may be a computing power request apparatus, or a control module configured to perform the computing power request method in the computing power request apparatus. In embodiments of this application, that the computing power request apparatus performs the computing power request method is used as an example, to describe the computing power request apparatus provided in embodiments of this application. In the computing power allocation method provided in embodiments of this application, an execution entity may be a computing power allocation apparatus, or a control module configured to perform the computing power allocation method in the computing power allocation apparatus. In embodiments of this application, that the computing power allocation apparatus performs the computing power allocation method is used as an example, to describe the computing power allocation apparatus provided in embodiments of this application. In the computing power execution method provided in embodiments of this application, an execution entity may be a computing power execution apparatus, or a control module configured to perform the computing power execution method in the computing power execution apparatus. In embodiments of this application, that the computing power execution apparatus performs the computing power execution method is used as an example, to describe the computing power execution apparatus provided in embodiments of this application.

Figure 5:
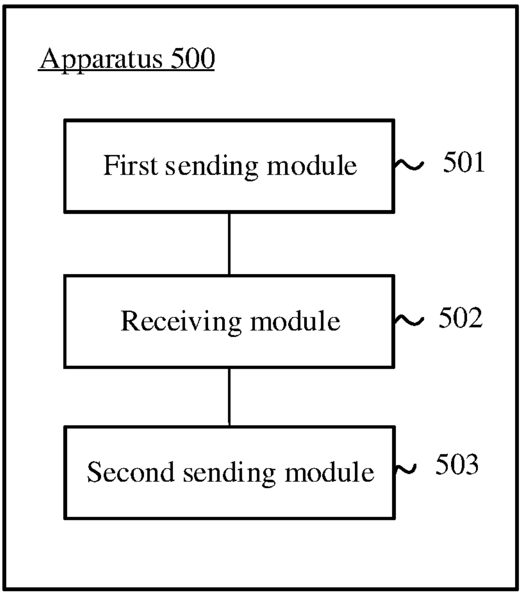
FIG. 5 is a schematic diagram of a structure of a computing power request apparatus according to an embodiment of this application.

FIG. 5 is a schematic diagram of a structure of a computing power request apparatus according to an embodiment of this application. The apparatus may correspond to terminals in other embodiments. As shown in FIG. 5, the apparatus 500 includes the following modules:

- a first sending module 501, configured to send a computing power request to a network side device, where the computing power request is used to request computing power for a computing power task in a terminal;
- a receiving module 502, configured to receive device information of a target computing power device responded by the network side device, where the target computing power device includes a device or device cluster with a computing power capability; and
- a second sending module 503, configured to send the computing power task to the target computing power device based on the device information, so that the target computing power device executes the computing power task.

Optionally, as an embodiment, the first sending module 501 is further configured to execute at least one of the following:

- sending computing power requirement information of the computing power task to the network side device, where the computing power requirement information is used for determining a target computing power device that matches a computing power requirement, and the computing power requirement information includes at least one of the following: a total amount of computing power required for the computing power task, a type of computing power required for the computing power task, an expected completing time period of the computing power task, or algorithm model information required for the computing power task; or
- sending computing power task description information to the network side device, where the computing power task description information is used for determining the computing power requirement information, and the computing power task description information includes at least one of the following: a type of the computing power task, a type of an algorithm model required for the computing power task, a task volume description of the computing power task, an expected completing time range of the computing power task, or an expected completing success rate of the computing power task.

Optionally, as an embodiment, the first sending module 501 is further configured to: send the computing power request to the terminal;

- determine the computing power requirement information based on the computing power task description information when the computing power request sent by a target application includes the computing power task description information, and the computing power request sent by the terminal includes the computing power requirement information; and
- send the computing power requirement information to the network side device.

Optionally, as an embodiment, the device information includes at least one of the following: device address information or a device identifier; and the second sending module 503 is further configured to:

- establish a connection with the target computing power device based on at least one of the device address information or the device identifier; and
- send the computing power task to the target computing power device in a case that the connection is successfully established.

Optionally, as an embodiment, a quantity of target computing power devices is one or more than one, where

- in a case that the quantity of target computing power devices is one, the target computing power device is configured to independently execute the computing power task, or the target computing power device is configured to split the computing power task and allocate the split computing power task to another computing power device, to jointly execute the computing power task, and the another computing power device is determined by the network side device; and
- in a case that the quantity of target computing power devices is more than one, the second sending module 503 is further configured to:

split the computing power task, to obtain a plurality of computing power subtasks; and send the plurality of computing power subtasks to a plurality of target computing power devices, where different target computing power devices are configured to execute different computing power subtasks.

Optionally, as an embodiment, the receiving module 502 is further configured to receive a computing power task execution result responded by the target computing power device; and the first sending module 501 is further configured to send notification information to the network side device in a case of determining that the computing power task execution result meets a preset condition or determining, based on the computing power task execution result, that execution of the computing power task succeeds, where the notification information is used by the network side device to release computing power reserved for the computing power task.

The apparatus 500 in embodiments of this application may refer to a process of the method 200 corresponding to embodiments of this application. Various units/modules in the apparatus 500 and other operations and/or functions are respectively for implementing corresponding processes in the method 200, and may implement the same or equivalent technical effects. For brevity, details are not described herein again.

Figure 6:
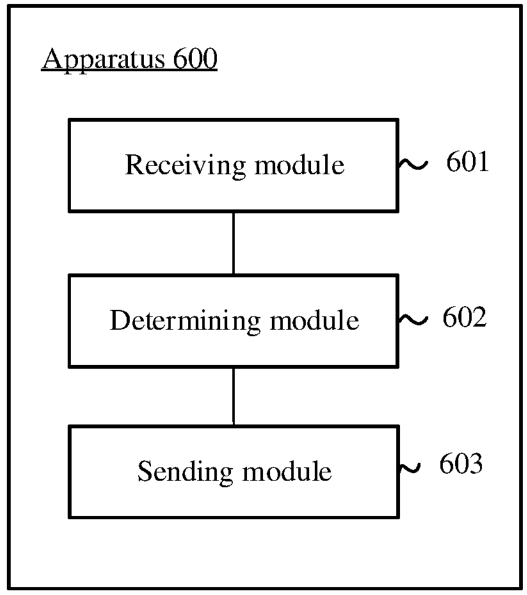
FIG. 6 is a schematic diagram of a structure of a computing power allocation apparatus according to an embodiment of this application.

FIG. 6 is a schematic diagram of a structure of a computing power allocation apparatus according to an embodiment of this application. The apparatus may correspond to network side devices in other embodiments. As shown in FIG. 6, the apparatus 600 includes the following modules:

a receiving module 601, configured to receive a computing power request from a terminal, where the computing power request is used to request computing power for a computing power task in the terminal;

a determining module 602, configured to determine a target computing power device based on the computing power request, where the target computing power device includes a device or device cluster with a computing power capability; and a sending module 603, configured to send device information of the target computing power device to the terminal, so that the terminal sends the computing power task to the target computing power device based on the device information, and the target computing power device executes the computing power task.

Optionally, as an embodiment, the receiving module 601 is further configured to execute at least one of the following:

receiving computing power requirement information of the computing power task from the terminal, where the computing power requirement information is used for determining a target computing power device that matches a computing power requirement, and the computing power requirement information includes at least one of the following: a total amount of computing power required for the computing power task, a type of computing power required for the computing power task, an expected completing time period of the computing power task, or algorithm model information required for the computing power task; or receiving computing power task description information from the terminal, where the computing power task description information is used for determining the computing power requirement information, and the computing power task description information includes at least one of the following: a type of the computing power task, a type of an algorithm model required for the computing power task, a task volume description of the computing power task, an expected completing time range of the computing power task, or an expected completing success rate of the computing power task.

Optionally, as an embodiment, the determining module 602 is further configured to execute at least one of the following:

determining the target computing power device based on the computing power requirement information in a case that the computing power request includes the computing power requirement information; or determining the computing power requirement information based on the computing power task description information in a case that the computing power request includes the computing power task description information; and determining the target computing power device based on the computing power requirement information.

Optionally, as an embodiment, the determining module 602 is further configured to:

obtain computing power state information of a plurality of computing power devices in advance, where the computing power state information includes at least one of the following: a total amount of computing power, a usage amount of computing power, a type of computing power, or available computing power;

match the computing power requirement information with the computing power state information of the plurality of computing power devices, and determine at least one matched candidate computing power device; and determine the target computing power device based on the at least one candidate computing power device.

Optionally, as an embodiment, the determining module 602 is further configured to:

send a computing power reservation request to the at least one candidate computing power device; and for any candidate computing power device, if computing power reservation success information responded by the candidate computing power device is received, determine the candidate computing power device as the target computing power device; or send a computing power reservation request to the at least one candidate computing power device based on a descending order of a priority of the computing power device; and determine a first candidate computing power device among the at least one candidate computing power device as the target computing power device, where the first candidate computing power device is a computing power device that receives the computing power reservation request and responds computing power reservation success information, where the priority of the computing power device is determined based on at least one of the following: the total amount of computing power of the computing power device, a matching degree between the total amount of computing power and the computing power task, or a routing distance between the computing power device and the terminal.

Optionally, as an embodiment, a quantity of target computing power devices is one or more than one, where in a case that the quantity of target computing power devices is more than one, the sending module 603 is further configured to:

send the device information of the plurality of target computing power devices to the terminal; or determine a primary device and a secondary device among the plurality of target computing power devices; and send device information of the primary device to the terminal, and send device information of the secondary device to the primary device, wherein the terminal sends the computing power task to the primary device based on the device information of the primary device, and after splitting the computing power task, the primary device allocates the split computing power task to the secondary device based on the device information of the secondary device, to jointly execute the computing power task.

Optionally, as an embodiment, the receiving module 601 is further configured to receive notification information from the terminal, where the notification information is sent after the terminal receives a computing power task execution result responded by the target computing power device, and in a case of determining that the computing power task execution result meets a preset condition or determining, based on the computing power task execution result, that execution of the computing power task succeeds; and the sending module 603 is further configured to send a computing power release request to the target computing power device, to release computing power reserved by the target computing power device for the computing power task.

The apparatus 600 in embodiments of this application may refer to a process of the method 300 corresponding to this embodiment of this application. Various units/modules in the apparatus 600 and other operations and/or functions are respectively for implementing corresponding processes in the method 300, and may implement the same or equivalent technical effects. For brevity, details are not described herein again.

Figures 7, 8:
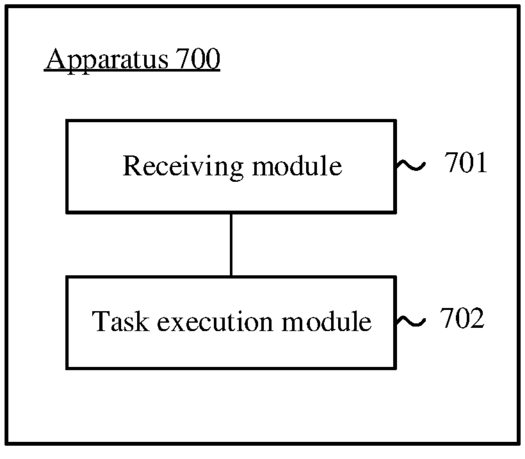
FIG. 7 is a schematic diagram of a structure of a computing power execution apparatus according to an embodiment of this application.
FIG. 8 is a schematic diagram of a structure of a communication device according to an embodiment of this application.

FIG. 7 is a schematic diagram of a structure of a computing power execution apparatus according to an embodiment of this application. The apparatus may correspond to target computing power devices in other embodiments. As shown in FIG. 7, the apparatus 700 includes the following modules:

a receiving module 701, configured to receive a computing power task from a terminal, where the computing power task is sent by the terminal based on device information of the target computing power device, the device information is responded to the terminal by a network side device after receiving a computing power request from the terminal and determining the target computing power device, the computing power request is used to request computing power for the computing power task in the terminal, and the target computing power device includes a device or device cluster with a computing power capability; and a task execution module 702, configured to execute the computing power task.

Optionally, as an embodiment, a quantity of target computing power devices is one or more than one, where in a case that the quantity of target computing power devices is one, the task execution module 702 is further configured to:

independently execute the computing power task; or split the computing power task and allocate the split computing power task to another computing power device, to jointly execute the computing power task, where the another computing power device is determined by the network side device, and after completing the computing power task, the another computing power device sends a computing power task execution result to the target computing power device; and in a case that the quantity of target computing power devices is more than one, the task execution module 702 is further configured to:

execute computing power subtasks from the terminal, where the computing power subtasks are obtained by splitting the computing power task by the terminal.

Optionally, as an embodiment, the task execution module 702 is further configured to send a computing power task execution result to the terminal; and the receiving module 701 is further configured to receive a computing power release request from the network side device, where the computing power release request is sent by the network side device after receiving notification information from the terminal, and the notification information is sent to the network side device by the terminal after receiving the computing power task execution result, and in a case of determining that the computing power task execution result meets a preset condition or determining, based on the computing power task execution result, that execution of the computing power task succeeds; and release computing power reserved for the computing power task based on the computing power release request.

The apparatus 700 in embodiments of this application may refer to a process of the method 400 corresponding to this embodiment of this application. Various units/modules in the apparatus 700 and other operations and/or functions are respectively for implementing corresponding processes in the method 400, and may implement the same or equivalent technical effects. For brevity, details are not described herein again.

The computing power request apparatus, the computing power allocation apparatus, and the computing power execution apparatus in embodiments of this application may be apparatuses, apparatuses or electronic devices with an operating system, or may be components, integrated circuits, or chips in a terminal. The apparatus or electronic device may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (TV), a cash machine, a self-service machine, or the like, which is not limited in embodiments of this application.

The computing power request apparatus, the computing power allocation apparatus, and the computing power execution apparatus provided in embodiments of this application may separately implement various processes of the method embodiments in FIG. 2 to FIG. 4, and implement the same technical effect, which will not be described in detail herein again to avoid repetition.

Optionally, as shown in FIG. 8, embodiments of this application further provide a communication device 800, including a processor 801, a memory 802, and a program or an instruction stored in the memory 802 and executable on the processor 801. For example, when the communication device 800 is a terminal, various processes of the computing power request method embodiment are implemented when the program or instruction is executed by the processor 801, and a same technical effect may be achieved. When the communication device 800 is a network side device, each process of the foregoing computing power allocation method embodiment is implemented when the program or instruction is executed by the processor 801, and a same technical effect may be achieved. To avoid repetition, details are not described herein again. When the communication device 800 is a target computing power device, each process of the foregoing computing power execution method embodiment is implemented when the program or instruction is executed by the processor 801, and a same technical effect may be achieved. To avoid repetition, details are not described herein again.

Figures 9, 10:
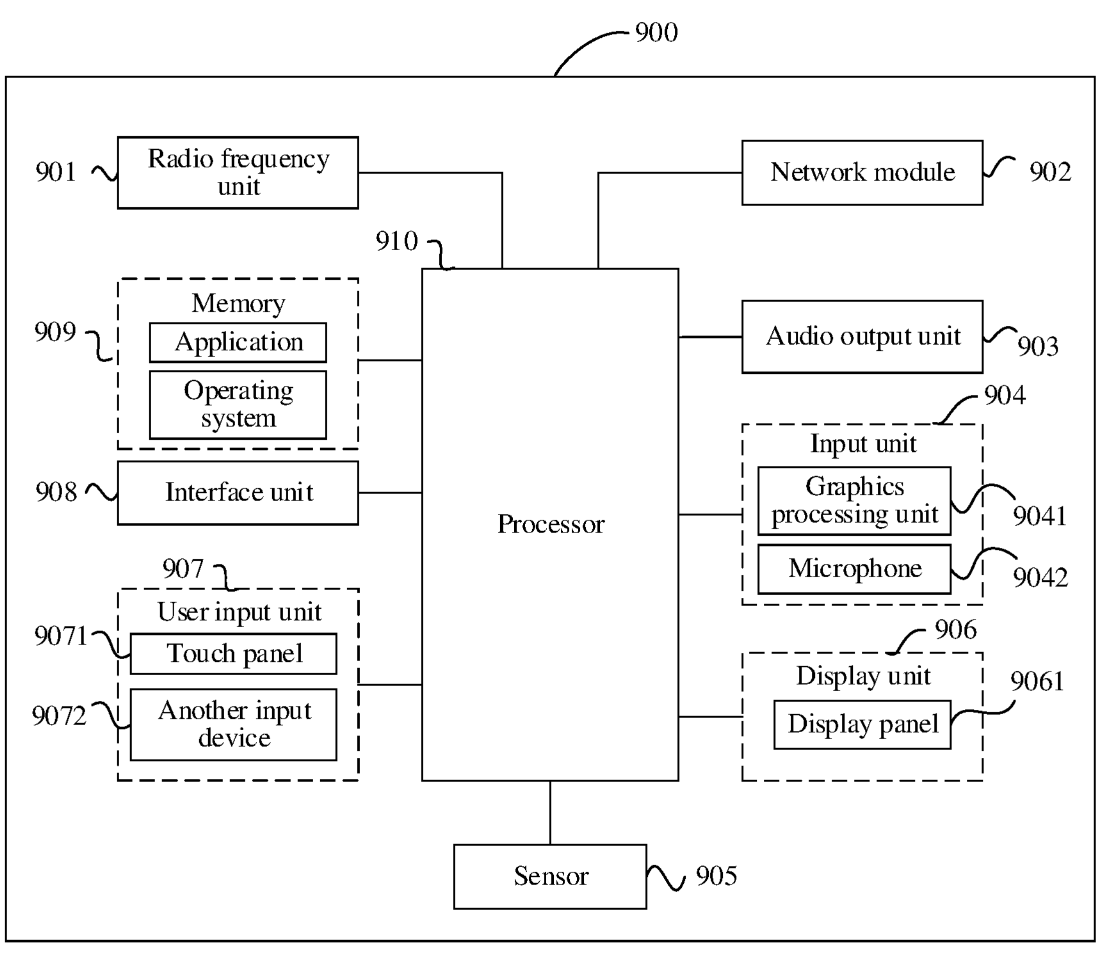
FIG. 9 is a schematic diagram of a structure of a terminal according to an embodiment of this application.
FIG. 10 is a schematic diagram of a structure of a network side device according to an embodiment of this application.

Embodiments of this application further provide a terminal, including a processor and a communication interface. The communication interface is configured to send a computing power request to a network side device, where the computing power request is used to request computing power for a computing power task in the terminal; receive device information of a target computing power device responded by the network side device, where the target computing power device includes a device or device cluster with a computing power capability; and send the computing power task to the target computing power device based on the device information, so that the target computing power device executes the computing power task. This terminal embodiment corresponds to the terminal side method embodiment. Each implementation process and implementation of the method embodiment may be applied to the terminal embodiment, and may achieve the same technical effect. For example, FIG. 9 is a schematic diagram of a hardware structure of a terminal according to an embodiment of this application.

The terminal 900 includes, but is not limited to, at least a part of components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include the power supply (such as a battery) for supplying power to the components. The power supply may be logically connected to the processor 910 by a power management system, thereby implementing functions such as charging, discharging, and power consumption management by using the power management system. A terminal structure shown in FIG. 9 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 904 may include a graphics processing unit (GPU) 9041 and a microphone 9042. The graphics processing unit 9041 performs processing on image data of a static picture or a video that is obtained by an image acquisition apparatus (for example, a camera) in a video acquisition mode or an image acquisition mode. The display unit 906 may include a display panel 9061, and the display panel 9061 may be configured by using a liquid crystal display, an organic light-emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include, but not limited to, a physical keyboard, a functional key (such as a volume control key or a switch key), a track ball, a mouse, and a joystick, which are not described herein in detail.

In embodiments of this application, after the radio frequency unit 901 receives downlink data from the network side device, the downlink data is processed by the processor 910; and in addition, uplink data is sent to the network side device. Generally, the radio frequency unit 901 includes, but is not limited to, an antenna, at least one amplifier, a transceiver, a coupler, a low noise amplifier, a duplexer, and the like. In addition, the radio frequency circuit may further communicate with another device through wireless communication.

The memory 909 may be configured to store a software program or an instruction and various data. The memory 909 may mainly include a program or an instruction storage area and a data storage area. The program or instruction storage area may store an operating system, an application program or instruction required by at least one function (such as a sound playback function and an image display function), and the like. In addition, the memory 909 may include a high-speed random access memory, and may further include a non-volatile memory, where the non-volatile memory may be a read-only memory (ROM), a programmable ROM (PROM), an erasable PROM (EPROM), an electrically EPROM (EEPROM), or a flash memory. Such as at least one magnetic disk storage device, a flash storage device, or other non-volatile solid-state storage devices.

The processor 910 may include one or more processing units. Optionally, the processor 910 may integrate an application processor and a modem, where the application processor mainly processes an operating system, a user interface, and an application program or instruction, and the modem mainly processes wireless communication, such as a baseband processor. It may be understood that the foregoing modem may either not be integrated into the processor 910.

The radio frequency unit 910 is configured to send a computing power request to a network side device, where the computing power request is used to request computing power for a computing power task in the terminal; receive device information of a target computing power device responded by the network side device, where the target computing power device includes a device or device cluster with a computing power capability; and send the computing power task to the target computing power device based on the device information, so that the target computing power device executes the computing power task.

Because when there is a computing power task in the terminal, the terminal may request computing power from the network side device, and the network side device determines the target computing power device with the computing power capability, and allocates the computing power of the target computing power device to the terminal, so that the terminal may execute the computing power task with the help of the computing power of the target computing power device. Therefore, when the computing power of the terminal is insufficient, normal execution of the computing power task may be guaranteed.

The terminal 900 provided in embodiments of this application may further implement various processes of the computing power request method embodiment, and implement the same technical effect, which will not be described in detail herein again to avoid repetition.

Embodiments of this application further provide a network side device, including a processor and a communication interface. The communication interface is configured to receive a computing power request from a terminal, where the computing power request is used to request computing power for a computing power task in the terminal; the processor is configured to determine a target computing power device based on the computing power request, where the target computing power device includes a device or device cluster with a computing power capability; and the communication interface is further configured to send device information of the target computing power device to the terminal, so that the terminal sends the computing power task to the target computing power device based on the device information, and the target computing power device executes the computing power task. The network side device embodiment corresponds to the network side device method embodiment. Each implementation process and implementation of the method embodiment may be applied to the network side device embodiment, and may achieve the same technical effect.

For example, embodiments of this application further provide a network side device. As shown in FIG. 10, the network device 1000 includes: an antenna 101, a radio frequency apparatus 102, and a baseband apparatus 103. The antenna 101 is connected to the radio frequency apparatus 102. In an uplink direction, the radio frequency apparatus 102 receives information through the antenna 101, and transmits the received information to the baseband apparatus 103 for processing. In a downlink direction, the baseband apparatus 103 performs processing on the to-be-transmitted information, and transmits the to-be-transmitted information to the radio frequency apparatus 102. After performing processing on the received information, the radio frequency apparatus 102 transmits the received information out through the antenna 101.

The frequency band processing apparatus may be located in the baseband apparatus 103, and the method performed by the network side device in the foregoing embodiment may be implemented in the baseband apparatus 103. The baseband apparatus 103 includes a processor 104 and a memory 105.

The baseband apparatus 103 may include, for example, at least one baseband board, and a plurality of chips are arranged on the baseband board. As shown in FIG. 10, for example, one of the chips is a processor 104, and is connected with the memory 105, to invoke a program in the memory 105, and to perform the network device operation shown in the foregoing method embodiments.

The baseband apparatus 103 may further include a network interface 106 used for exchanging information with the radio frequency apparatus 102. For example, the interface is a common public radio interface (CPRI).

For example, the network side device of embodiments of the present application further includes: an instruction or a program stored in the memory 105 and executable on the processor 104. The processor 104 invokes the instruction or program in the memory 105 to perform the method performed by each module shown in FIG. 6, and implements the same technical effect, which will not be described in detail herein again to avoid repetition.

Embodiments of this application further provide a non-transitory readable storage medium, storing therein a program or an instruction, where when the program or instruction is executed by a processor, various processes of the computing power request method embodiment are implemented, or various processes of the computing power allocation method embodiment are implemented, or various processes of the computing power execution method embodiment are implemented, and the same technical effects may be achieved. This is not repeated herein to avoid repetition.

The processor is a processor in the terminal described in the foregoing embodiment. The non-transitory readable storage medium includes a non-transitory computer-readable storage medium, for example, a Read-Only Memory (ROM), a Random Access Memory (RAM), a magnetic disk, an optical disc or the like.

Embodiments of this application further provide a chip, including a processor and a communication interface, where the communication interface is coupled to the processor. The processor is configured to run a program or an instruction, to implement various processes of the computing power request method embodiment, or various processes of the computing power allocation method embodiment, or implements various processes of the computing power execution method embodiment, and may implement the same technical effects. This is not repeated herein to avoid repetition.

It should be understood that the chip mentioned in embodiments of this application may further be referred to as a system-level chip, a system chip, a chip system, a system on chip, or the like.

Embodiments of this application further provide a computer program/program product, being stored in a non-volatile storage medium, where the computer program/program product, when executed by at least one processor, implements various processes of the computing power request method embodiment, or implements various processes of the computing power allocation method embodiment, or implements various processes of the computing power execution method embodiment, and may implement the same technical effect, which will not be described in detail herein again to avoid repetition.

It is to be noted that the terms "include", "comprise" and any other variants mean to cover the non-exclusive inclusion, so that the process, method, object, or apparatus which include a series of elements not only include those elements, but also include other elements which are not clearly listed, or include inherent elements of the process, method, object, or apparatus. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Although embodiments of this application have been described above with reference to the accompanying drawings, this application is not limited to the implementations described above, and the implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A computing power request method, performed by a terminal and comprising:

sending a computing power request to a network side device, wherein the computing power request is used to reserve computing power for a computing power task in the terminal by the network side device;

receiving device information of a target computing power device responded by the network side device, wherein the target computing power device comprises a device or device cluster with a computing power capability;

sending the computing power task to the target computing power device based on the device information, so that the target computing power device executes the computing power task to receive a computing power task execution result;

receiving the computing power task execution result responded by the target computing power device; and sending notification information to the network side device, wherein the notification information indicates that the computing power task execution result meets a preset condition or that execution of the computing power task succeeds, and wherein the notification information is sent to the network side device to release computing power reserved for the computing power task;

wherein the sending a computing power request to a network side device comprises at least one of the following:

sending computing power requirement information of the computing power task to the network side device, wherein the computing power requirement information is used for determining a target computing power device that matches a computing power requirement, and the computing power requirement information comprises at least one of the following: a total amount of computing power required for the computing power task, a type of computing power required for the computing power task, an expected completing time period of the computing power task, or algorithm model information required for the computing power task, wherein the total amount of computing power required for the computing power task is a total quantity of central processing units (CPUs), graphics processing units (GPUs), or servers required for the computing power task; or sending computing power task description information to the network side device, wherein the computing power task description information is used for determining the computing power requirement information, and the computing power task description information comprises at least one of the following: a type of the computing power task, a type of an algorithm model required for the computing power task, a task volume description of the computing power task, an expected completing time range of the computing power task, or an expected completing success rate of the computing power task.

2. A non-transitory computer readable storage medium, storing a program or an instruction, wherein the program or instruction, when executed by a processor, causes the processor to perform the computing power request method according to claim 1.

3. The method according to claim 1, wherein before the sending a computing power request to a network side device, the method further comprises:

sending, by a target application in the terminal, the computing power request to the terminal; and in a case that the computing power request sent by the target application comprises the computing power task description information, and the computing power request sent by the terminal comprises the computing power requirement information, the method further comprises:

determining the computing power requirement information based on the computing power task description information; and sending the computing power requirement information to the network side device.

4. The method according to claim 1, wherein the device information comprises at least one of the following: device address information or a device identifier; and the sending the computing power task to the target computing power device based on the device information comprises:

establishing a connection with the target computing power device based on at least one of the device address information or the device identifier; and sending the computing power task to the target computing power device in a case that the connection is successfully established.

5. The method according to claim 1, wherein a quantity of target computing power devices is one or more than one, wherein in a case that the quantity of target computing power devices is one, the target computing power device is configured to independently execute the computing power task, or the target computing power device is configured to split the computing power task and allocate a split computing power task to another computing power device, to jointly execute the computing power task, and the another computing power device is determined by the network side device; and in a case that the quantity of target computing power devices is more than one, the sending the computing power task to the target computing power device based on the device information comprises:

splitting the computing power task, to obtain a plurality of computing power subtasks; and sending the plurality of computing power subtasks to a plurality of target computing power devices, wherein different target computing power devices are configured to execute different computing power subtasks.

6. A terminal, comprising a processor and a memory storing a program or an instruction that, when executed by the processor, causes the processor to perform the computing power request method according to claim 1.

7. A computing power allocation method, performed by a network side device and comprising:

receiving a computing power request from a terminal, wherein the computing power request is used to reserve computing power for a computing power task in the terminal by the network side device;

determining a target computing power device based on the computing power request, wherein the target computing power device comprises a device or device cluster with a computing power capability;

sending device information of the target computing power device to the terminal, so that the terminal sends the computing power task to the target computing power device based on the device information, and the target computing power device executes the computing power task to receive a computing power task execution result;

receiving notification information from the terminal, wherein the notification information is sent after the terminal receives the computing power task execution result responded by the target computing power device, and wherein the notification information indicates that the computing power task execution result meets a preset condition or that execution of the computing power task succeeds; and sending a computing power release request to the target computing power device, to release computing power reserved by the target computing power device for the computing power task;

wherein the receiving a computing power request from a terminal comprises at least one of the following:

receiving computing power requirement information of the computing power task from the terminal, wherein the computing power requirement information is used for determining a target computing power device that matches a computing power requirement, and the computing power requirement information comprises at least one of the following: a total amount of computing power required for the computing power task, a type of computing power required for the computing power task, an expected completing time period of the computing power task, or algorithm model information required for the computing power task, wherein the total amount of computing power required for the computing power task is a total quantity of central processing units (CPUs), graphics processing units (GPUs), or servers required for the computing power task; or receiving computing power task description information from the terminal, wherein the computing power task description information is used for determining the computing power requirement information, and the computing power task description information comprises at least one of the following: a type of the computing power task, a type of an algorithm model required for the computing power task, a task volume description of the computing power task, an expected completing time range of the computing power task, or an expected completing success rate of the computing power task.

8. A network side device, comprising a processor and a memory storing a program or an instruction that, executed by the processor, causes the processor to perform the computing power allocation method according to claim 7.

9. The method according to claim 7, wherein the determining a target computing power device based on the computing power request comprises at least one of the following:

determining the target computing power device based on the computing power requirement information in a case that the computing power request comprises the computing power requirement information; or determining the computing power requirement information based on the computing power task description information in a case that the computing power request comprises the computing power task description information; and determining the target computing power device based on the computing power requirement information.

10. The method according to claim 9, wherein the determining the target computing power device based on the computing power requirement information comprises:

obtaining computing power state information of a plurality of computing power devices in advance, wherein the computing power state information comprises at least one of the following: a total amount of computing power, a usage amount of computing power, a type of computing power, or available computing power;

matching the computing power requirement information with the computing power state information of the plurality of computing power devices, and determining at least one matched candidate computing power device; and determining the target computing power device based on the at least one candidate computing power device.

11. The method according to claim 10, wherein the determining the target computing power device based on the at least one candidate computing power device comprises:

sending a computing power reservation request to the at least one candidate computing power device; and for any candidate computing power device, if computing power reservation success information responded by the candidate computing power device is received, determining the candidate computing power device as the target computing power device; or sending a computing power reservation request to the at least one candidate computing power device based on a descending order of a priority of a computing power device; and determining a first candidate computing power device among the at least one candidate computing power device as the target computing power device, wherein the first candidate computing power device is a computing power device that receives the computing power reservation request and responds computing power reservation success information, wherein the priority of the computing power device is determined based on at least one of the following: the total amount of computing power of the computing power device, a matching degree between the total amount of computing power and the computing power task, or a routing distance between the computing power device and the terminal.

12. The method according to claim 7, wherein a quantity of target computing power devices is one or more than one, wherein in a case that the quantity of target computing power devices is more than one, the sending device information of the target computing power device to the terminal comprises:

sending device information of a plurality of target computing power devices to the terminal; or determining a primary device and a secondary device among the plurality of target computing power devices; and sending device information of the primary device to the terminal, and sending device information of the secondary device to the primary device, so that the terminal sends the computing power task to the primary device based on the device information of the primary device, and after splitting the computing power task, the primary device allocates a split computing power task to the secondary device based on the device information of the secondary device, to jointly execute the computing power task.

13. A computing power execution method, performed by a target computing power device and comprising:

receiving a computing power task from a terminal, wherein the computing power task is sent by the terminal using device information of the target computing power device, the device information is responded to the terminal by a network side device after receiving a computing power request from the terminal and determining the target computing power device, the computing power request is used to request computing power for the computing power task in the terminal, and the target computing power device comprises a device or device cluster with a computing power capability;

receiving, from the network side device, a power reserve request to execute the computing power task;

executing the computing power task to receive a computing power task execution result;

sending the computing power task execution result to the terminal;

receiving a computing power release request from the network side device, wherein the computing power release request is sent by the network side device after receiving notification information from the terminal, and the notification information is sent to the network side device by the terminal after receiving the computing power task execution result, and wherein the notification information indicates that the computing power task execution result meets a preset condition or that execution of the computing power task succeeds; and releasing, based on the computing power release request, computing power reserved for the computing power task;

wherein the computing power request comprises at least one of the following:

computing power requirement information of the computing power task, wherein the computing power requirement information is used for determining a target computing power device that matches a computing power requirement, and the computing power requirement information comprises at least one of the following: a total amount of computing power required for the computing power task, a type of computing power required for the computing power task, an expected completing time period of the computing power task, or algorithm model information required for the computing power task, wherein the total amount of computing power required for the computing power task is a total quantity of central processing units (CPUs), graphics processing units (GPUs), or servers required for the computing power task; or computing power task description information, wherein the computing power task description information is used for determining the computing power requirement information, and the computing power task description information comprises at least one of the following: a type of the computing power task, a type of an algorithm model required for the computing power task, a task volume description of the computing power task, an expected completing time range of the computing power task, or an expected completing success rate of the computing power task.

14. A target computing power device, comprising a processor and a memory storing a program or an instruction that, when executed by the processor, causes the processor to perform the computing power execution method according to claim 13.

15. The method according to claim 13, wherein a quantity of target computing power devices is one or more than one, wherein in a case that the quantity of target computing power devices is one, the executing the computing power task comprises:

independently executing the computing power task; or splitting the computing power task and allocating a split computing power task to another computing power device, to jointly execute the computing power task, wherein the another computing power device is determined by the network side device, and after completing the computing power task, the another computing power device sends a computing power task execution result to the target computing power device; and in a case that the quantity of target computing power devices is more than one, the executing the computing power task comprises:

executing computing power subtasks from the terminal, wherein the computing power subtasks are obtained by splitting the computing power task by the terminal.

* * * * *